(12) United States Patent
Tanaka et al.

(10) Patent No.: US 12,354,574 B2
(45) Date of Patent: Jul. 8, 2025

(54) SYSTEM OF GENERATING MODEL FOR ESTIMATION, AND ESTIMATION SYSTEM

(71) Applicant: NTT DOCOMO, INC., Chiyoda-ku (JP)

(72) Inventors: Shigeki Tanaka, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 620 days.

(21) Appl. No.: 17/624,436

(22) PCT Filed: Jun. 17, 2020

(86) PCT No.: PCT/JP2020/023824
§ 371 (c)(1),
(2) Date: Jan. 3, 2022

(87) PCT Pub. No.: WO2021/005987
PCT Pub. Date: Jan. 14, 2021

(65) Prior Publication Data
US 2022/0399000 A1    Dec. 15, 2022

(30) Foreign Application Priority Data
Jul. 5, 2019   (JP) ................. 2019-126360

(51) Int. Cl.
*G10H 1/00*   (2006.01)
*G06N 3/08*   (2023.01)

(52) U.S. Cl.
CPC .......... *G10H 1/0008* (2013.01); *G06N 3/08* (2013.01); *G10H 2210/031* (2013.01); *G10H 2250/311* (2013.01)

(58) Field of Classification Search
CPC ............. G10H 1/0008; G10H 1/365; G10H 2210/031; G10H 2250/311;
(Continued)

(56) References Cited

U.S. PATENT DOCUMENTS

2019/0156819 A1* 5/2019 Shafran .................. G10L 15/02

FOREIGN PATENT DOCUMENTS

JP    2012-78387 A    4/2012

OTHER PUBLICATIONS

Hsu, Kai-Chun et al. (Neural Network Based Next-Song Recommendation, 2016. https://arxiv.org/abs/1606.07722, retrieved Aug. 7, 2016) (Year: 2016).*

(Continued)

*Primary Examiner* — Dedei K Hammond
*Assistant Examiner* — Philip G Scoles
(74) *Attorney, Agent, or Firm* — Oblon, McClelland, Maier & Neustadt, L.L.P.

(57) ABSTRACT

A system of generating a model for estimation is a system that generates the model for estimation used for estimation based on information about musical pieces, the system including: a learning data acquiring unit configured to acquire learning information in which information about audio data of a plurality of musical pieces having sequences is aligned in a dimension of the sequences in order of the sequences that is learning data used for machine learning; and a model generating unit configured to generate the model for estimation by performing machine learning using the learning information as an input to the model for estimation performing convolution using a kernel in the dimension of the sequences.

3 Claims, 9 Drawing Sheets

(58) Field of Classification Search
CPC ...... G10H 2240/131; G06N 3/08; G06N 3/09; G06N 3/0464
See application file for complete search history.

(56) References Cited

OTHER PUBLICATIONS

Van den Oord, Aaron et al. (Deep content-based music recommendation. NIPS'13: Proceedings of the 26th International Conference on Neural Information Processing Systems, vol. 2, pp. 2645-2653. ISBN 9781632660244. Retrieved Aug. 7, 2024) (Year: 2013).*
International Preliminary Report on Patentability and Written Opinion issued Jan. 20, 2022 in PCT/JP2020/023824, 6 pages.
International Search Report mailed on Sep. 1, 2020 in PCT/JP2020/023824 filed on Jun. 17, 2020, 1 page.
Hsu, Kai-Chun et al., "Neural Network Based Next-Song Recommendation," arxiv [online], 2016, 6 pages.
Oord, Aaron van den et al., "Deep content-based music", Advances in Neural Information Processing Systems 26 (NIPS 2013), Neural Information, Processig System Foundation, Inc. [online], 2013, pp. 1-9, 10 pages.
Japanese Office Action issued Mar. 12, 2024 in Japanese Patent Application No. 2021-530560 (with unedited computer-generated English translation), 6 pages.

* cited by examiner

| TERMINAL ID | SINGING TIME | MUSICAL PIECE | MUSICAL PIECE ID |
|---|---|---|---|
| A1 | 2018-07-01 22:55 | AAA | 1 |
| A1 | 2018-07-01 22:58 | BBB | 2 |
| A1 | 2018-07-01 23:25 | CCC | 3 |
| A1 | 2018-07-01 23:28 | DDD | 4 |
| A2 | 2018-07-01 22:55 | EEE | 5 |

SYSTEM OF GENERATING MODEL FOR ESTIMATION, AND ESTIMATION SYSTEM

TECHNICAL FIELD

The present invention relates to a system of generating a model for estimation that generates a model for estimation used for estimation based on information about a musical piece and an estimation system that performs estimation using a model for estimation.

BACKGROUND ART

Conventionally, it has been proposed to recommend a musical piece to a user on the basis of a singing history of the user in karaoke (for example, see Patent Literature 1).

CITATION LIST

Patent Literature

[Patent Literature 1] Japanese Unexamined Patent Publication No. 2012-78387

SUMMARY OF INVENTION

Technical Problem

Although even a musical piece that a user has never sung in the past can be recommended according to the method disclosed in Patent Literature 1 described above, the sequence in which the user has sung musical pieces is not appropriately taken into account therein. For example, in a case in which a user group composed of a plurality of users performs karaoke, generally, different users sing songs in a sequence, and thus the sequence of musical pieces that have been sung so far needs to be taken into account in recommendation of a next musical piece. Thus, in the method disclosed in Patent Literature 1, there is concern that recommendation cannot be appropriately performed in view of this.

One embodiment of the present invention is in view of the situation described above, and an object thereof is to provide a system of generating a model for estimation and an estimation system capable of appropriately performing estimation based on information about musical pieces.

Solution to Problem

In order to achieve the object described above, a system of generating a model for estimation according to one embodiment of the present invention is a system of generating a model for estimation that generates the model for estimation used for estimation based on information about musical pieces, the system including: a learning data acquiring unit configured to acquire learning information that is learning data used for machine learning and in which information about audio data of a plurality of musical pieces having sequences is aligned in a dimension of the sequences in order of the sequences; and a model generating unit configured to generate the model for estimation by performing machine learning using the learning information acquired by the learning data acquiring unit as an input to the model for estimation performing convolution using a kernel in the dimension of the sequences.

In addition, an estimation system according to one embodiment of the present invention is an estimation system that performs estimation using a model for estimation generated by a system of generating a model for estimation, the estimation system including: a model use data acquiring unit configured to acquire information for estimation in which information about audio data of a plurality of musical pieces having sequences is aligned in a dimension of the sequences in order of the sequences; and a model using unit configured to perform estimation by inputting the information for estimation acquired by the model use data acquiring unit to the model for estimation.

According to one embodiment of the present invention, estimation can be performed using information in which information about audio data of a plurality of musical pieces having sequences is aligned in a dimension of the sequences in order of the sequences on the basis of a model for estimation generated using machine learning. In this model for estimation, convolution using a kernel in the dimension of the sequences is performed. For this reason, characteristics relating to the sequence of musical pieces are appropriately taken into account in estimation. For example, according to convolution, robust estimation can be performed also for slight deviation in the sequence direction. Thus, according to one embodiment of the present invention, estimation based on information about musical pieces can be appropriately performed.

Advantageous Effects of Invention

According to one embodiment of the present invention, estimation based on information about musical pieces can be appropriately performed.

DESCRIPTION OF EMBODIMENTS

Hereinafter, a system of generating a model for estimation and an estimation system according an embodiment of the present invention will be described in detail with reference to the drawings. In description of the drawings, the same reference signs will be assigned to the same elements, and duplicate description will be omitted.

Figure 1:
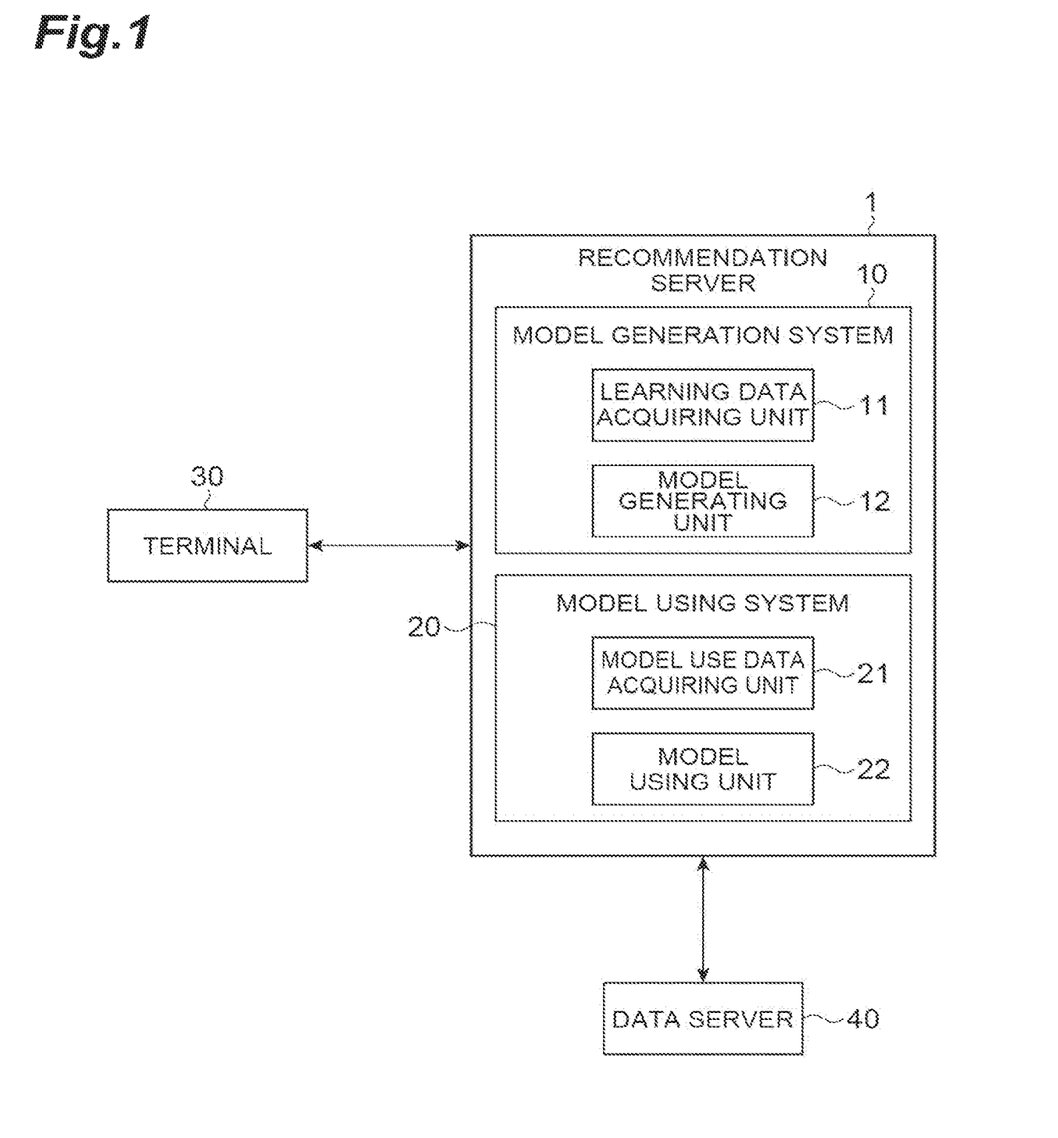
FIG. 1 is a diagram illustrating the configuration of a recommendation server that is a system of generating a model for estimation and an estimation system according to an embodiment of the present invention.

FIG. 1 illustrates a recommendation server 1 that is a system of generating a model for estimation and an estimation system according to this embodiment. The recommendation server 1 is a system that recommends information about a musical piece to a user. More specifically, the recommendation server 1 recommends a musical piece to sing or a singer thereof when a user sings karaoke. The recommendation server 1 recommends regarding a musical piece to sing next after a musical piece is sung. The recommendation server 1 may recommend regarding a musical piece to sing next every time when a musical piece is being sung.

In this embodiment, a user who is a target for recommendation may include a group composed of a plurality of users performing karaoke at the same time, for example, a group of users singing songs in a sequence. In the following description, even in a case in which only a user is mentioned, it includes a group composed of a plurality of users. In addition, the recommendation server 1 may recommend information about a musical piece to be used by a user doing something other than karaoke. For example, the recommendation server 1 may perform recommendation of a musical piece for a user to listen to.

The recommendation server 1 generates a model for estimation (learned model) used for estimation on the basis of information about musical pieces by performing machine learning and performs recommendation using the generated model for estimation. The recommendation server 1 includes a model generation system 10 as a component for generating a model for estimation and a model using system 20 as a component for performing recommendation. The model generation system 10 is a system of generating a model for estimation that generates a model for estimation according to this embodiment. The model using system 20 is an estimation system that performs estimation using the model for estimation according to this embodiment.

The recommendation server 1 is configured using a server apparatus having a communication function. The recommendation server 1 may be realized by a plurality of server apparatuses, in other words, computer systems. The recommendation server 1 can perform transmission/reception of information between the terminal 30 and the data server 40 through a network such as the Internet or a dedicated line. In addition, at the time of transmitting/receiving information, information may be relayed by a relay server disposed between such devices.

The terminal 30 is a terminal that is used by a user at a location such as a karaoke parlor. For example, the terminal 30 is used by a user to search for and input a musical piece at a location such as a karaoke parlor. For example, the terminal 30 is an information terminal that is provided at a location such as a karaoke parlor. Alternatively, the terminal 30 may be an information terminal such as a smartphone owned by an individual user. In such a case, an application for a karaoke parlor realizing the function of the terminal 30 is installed and used in the information terminal. The terminal 30 requests recommended content from the recommendation server 1, receives information about recommendation from the recommendation server 1, and performs output such as display. A user can determine a musical piece to sing by referring to the output.

The data server 40 is an apparatus that stores data used for recommendation using the recommendation server 1. The stored information will be described more specifically below. A plurality of data servers 40 may be provided for respective types of data.

Next, functions of the model generation system 10 and the model using system 20 included in the recommendation server 1 according to this embodiment will be described. As illustrated in FIG. 1, the model generation system 10 is configured to include a learning data acquiring unit 11 and a model generating unit 12.

The learning data acquiring unit 11 is a functional unit that acquires learning data used for machine learning for generating a model for estimation. The learning data acquiring unit 11 acquires learning information in which information about audio data of a plurality of musical pieces having sequences is aligned in a dimension of the sequences in order of the sequences as learning data. The information about the audio data is a spectrogram. More specifically, the learning data acquiring unit 11 acquires learning data as below.

The learning data acquiring unit 11 stores information about musical pieces in advance. These musical pieces are musical pieces that can be provided in karaoke, in other words, musical pieces that can be used by a user. The learning data acquiring unit 11 stores a musical piece ID that is information (an identifier) for identifying each musical piece, a singer ID that is information (an identifier) for identifying a singer singing the musical piece, and the like, which are set in advance, in association with each other. The information stored in the recommendation server 1 in advance is acquired from the data server 40 and the like unless particularly mentioned otherwise.

Figure 2:
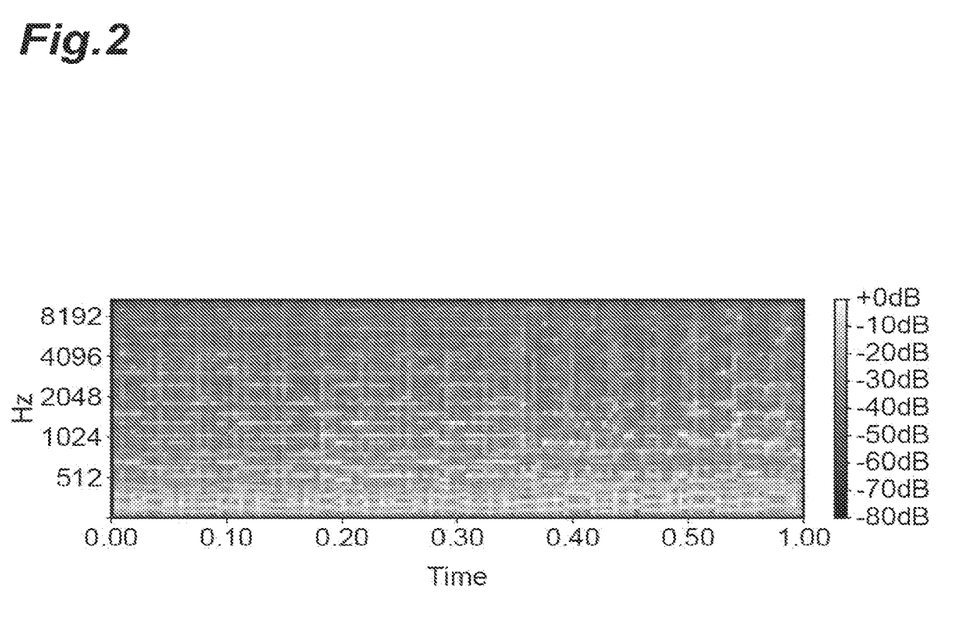
FIG. 2 is a diagram illustrating an example of a spectrogram converted from audio data of a musical piece.

The learning data acquiring unit 11 acquires audio data of each musical piece from the data server 40. For example, the audio data is data (a sound source) used for playback of a musical piece in karaoke and is data of an audio waveform that is a numerical value of a signal intensity for each time. As the audio data, MPEG-1 Audio Layer-3 (MP3) may be used. The learning data acquiring unit 11 converts audio data of each musical piece into a spectrogram (mel spectrogram). The learning data acquiring unit 11 converts audio data of a time frame set to be common in advance into a spectrogram for each musical piece. For example, audio data for one minute is converted from the beginning of each musical piece into a spectrogram. The reason for this is that musical pieces having different time lengths are handled as data of the same size. The conversion of audio data into a spectrogram can be performed using a conventional method. The converted spectrogram is data of a numerical value of a signal intensity (for example, dB) for each time (for example, seconds elapsed from the beginning of a musical piece) and each frequency (for example, Hz). FIG. 2 illustrates an example of a spectrogram of a certain musical piece. As illustrated in FIG. 2, a spectrogram can be handled as an image. In addition, as the information based on audio data, arbitrarily character-quantized information other than the spectrogram may be used. Furthermore, as the information based on audio data, the data of the waveform described above may be used.

Figure 3:
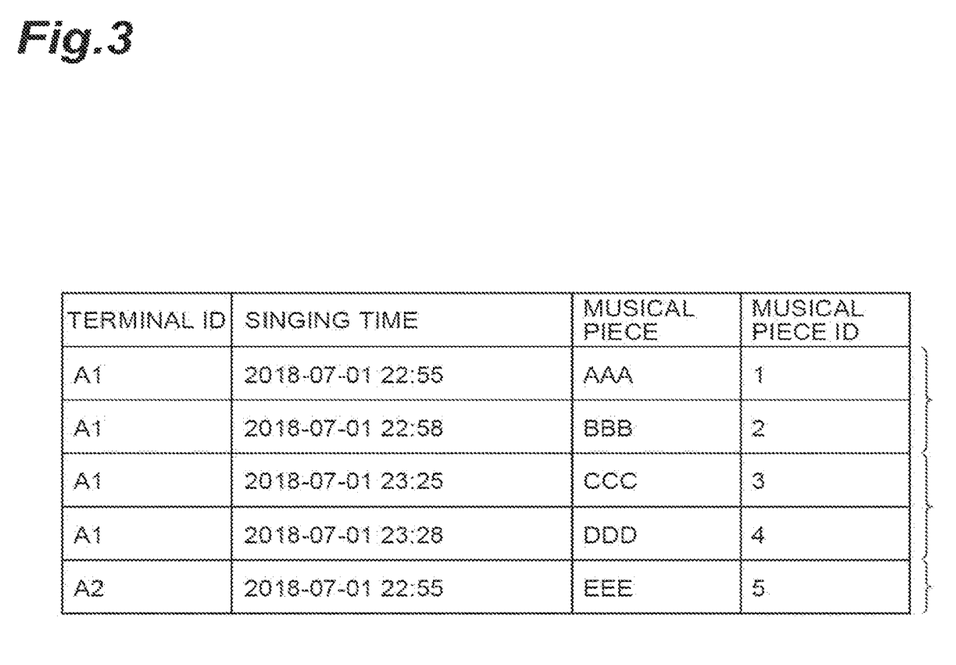
FIG. 3 is a table illustrating an example of time series information that represents musical pieces sung in the past.

The learning data acquiring unit 11 acquires information of a time series about a plurality of musical pieces used in the past. More specifically, the learning data acquiring unit 11 acquires a log that is information of a time series representing a plurality of musical pieces sung in the past at a location such as a karaoke parlor. The learning data acquiring unit 11 acquires the information from the data server 40. FIG. 3 illustrates an example of the information. The information is information in which a terminal ID, a singing time, a musical piece, and a musical piece ID are associated with each other. The terminal ID is information (an identifier) for identifying the terminal 30 used in the use of a musical piece at a location such as a karaoke parlor. A terminal ID is set for each terminal 30 in advance. The singing time is information representing a time at which the musical piece is used (sung) (for example, as illustrated in FIG. 3, year/month/date hour:minute). The musical piece is a musical piece name of a used (sung) musical piece. The musical piece ID is a musical piece ID of a used (sung) musical piece.

At a location such as a karaoke parlor, users do not usually log in when using the terminal 30. For this reason, like the information illustrated in this embodiment, there are cases in which information representing a user who sang each musical piece is not included in the singing history at a location such as a karaoke parlor. For machine learning, information of a history relating to the use of musical pieces needs to be configured in units of respective users. The learning data acquiring unit 11 generates learning data on the basis of a singing time included in the acquired information. In this embodiment, one session is set from user's start to end of karaoke, for example, from entering a location such as a karaoke parlor to leaving the location. The learning data acquiring unit 11 generates the information described above in units of respective sessions.

The learning data acquiring unit 11 refers to a singing time of information of a musical piece that has been sung immediately before with the same terminal ID for each piece of the acquired information. The learning data acquiring unit 11 determines whether or not a predetermined time set in advance has elapsed from singing of the immediately preceding musical piece. When the predetermined time has not elapsed, it is assumed that singing is performed by the same user, and the learning data acquiring unit 11 determines that the corresponding information is information configuring the same session as that of the information of the immediately preceding musical piece. When the predetermined time has elapsed, it is assumed that singing is performed by another user, and the learning data acquiring unit 11 determines that the corresponding information is information configuring another session different from that of the information of the immediately preceding musical piece. For example, in the example of information illustrated in FIG. 3, information of a first row and a second row configures one session, information of a third row and a fourth row configures one session, and information of a fifth row configures one session. Musical pieces configuring a session have singing sequences as described above.

The learning data acquiring unit 11 associates a spectrogram, which is information based on the audio data described above, with each piece of information of musical pieces sung in each session by using the musical piece ID as a key.

Subsequently, the learning data acquiring unit 11 generates learning information on the basis of the information described above. The learning data acquiring unit 11 generates and acquires learning information by aligning spectrograms of a plurality of musical pieces corresponding to a number set in advance in order of sequences in the musical piece sequence dimension. As described above, the spectrogram is two-dimensional information of a time and a frequency. The learning information has the musical piece sequence dimension in addition to such dimensions and thus is three-dimensional information. The number of spectrograms configuring learning information, that is, the number of musical pieces, corresponds to one input to a model for estimation. For example, when this number is 3, learning information including spectrograms corresponding to three pieces is one input to the model for estimation. The model for estimation receives spectrograms of three consecutive musical pieces as an input and outputs information about a musical piece to recommend a musical piece after the last musical piece among the three musical pieces.

The learning data acquiring unit 11 identifies all the combinations of consecutive musical pieces for generating learning information from musical pieces included in a session. The last musical piece among the musical pieces included in a session is not used for generating learning information. For example, in a case in which one session is composed of five musical pieces, the first to third musical pieces and the second to fourth musical pieces are set as consecutive musical pieces for generating learning information. The learning data acquiring unit 11 acquires (reads) spectrograms of such musical pieces and aligns the spectrograms in order of sequences, thereby generating learning information.

The learning data acquiring unit 11 generates and acquires learning use musical piece information relating to musical pieces used after a plurality of musical pieces corresponding to learning information as learning data. The learning data acquiring unit 11 sets a musical piece after the last musical piece among a plurality of musical pieces corresponding to learning information in a session as a musical piece corresponding to the output of the model for estimation at the time of machine learning. For example, in a case in which first to third musical pieces of a session are musical pieces corresponding to learning information, a fourth musical piece is a musical piece corresponding to the output of the model for estimation. Information about the musical piece is learning use musical piece information. In the information about the musical piece, a musical piece ID and a singer ID are regarded as learning use musical piece information. The learning data acquiring unit 11 converts information representing a musical piece ID and a singer ID in the learning use musical piece information into a vector of dimensions corresponding to the number of the kinds of IDs in which elements corresponding to an ID are set to 1, and the other elements are set to 0.

The learning data acquiring unit 11 acquires learning information and learning use musical piece information in sessions corresponding to a number that is sufficient for generation of a model for estimation. In other words, such information in sessions corresponding to a number sufficient for generation of a model for estimation is prepared in advance. The learning data acquiring unit 11 outputs the acquired learning data to the model generating unit 12.

The model generating unit 12 is a functional unit that generates a model for estimation by performing machine learning using the learning data acquired by the learning data acquiring unit 11. The model for estimation generated by the model generating unit 12 performs convolution using a kernel. The convolution using the kernel is performed in the sequence dimension. In addition, the model for estimation performs pooling in a dimension other than the sequence dimension. Furthermore, the model for estimation outputs information about a musical piece to recommend. For generation of a model for estimation, the model generating unit 12 performs machine learning using the learning information acquired by the learning data acquiring unit 11 as an input to the model for estimation.

The model for estimation generated by the model generating unit 12 is a model that receives information for estimation in which information about audio data of a plurality of musical pieces having sequences is aligned in the order of the sequences in the sequence dimension as an input and outputs information about a musical piece to recommend. In other words, the model for estimation is a model that estimates (predicts) information about a musical piece to recommend from information for estimation. The number of musical pieces configuring the information for estimation is the same as the number of musical pieces configuring each piece of the learning information described above. For example, the model for estimation is configured to include a neural network. The neural network may be configured to have multiple layers. In other words, the model generating unit 12 may generate a model for estimation by performing deep learning.

For example, in a model for estimation, neurons of a number corresponding to information for estimation are provided as neurons used for inputting the information for estimation to an input layer. More specifically, as described above, neurons correspond to "the number of times in the spectrogram×the number of frequencies×the number of musical pieces configuring information for estimation" are provided.

For example, the model for estimation outputs a numerical value representing a degree of recommendation for each musical piece and a numerical value representing a degree of recommendation for a singer as information about musical pieces to recommend. In an output layer of the model for estimation, neurons corresponding to the number of musical pieces that are recommendation targets are provided as neurons used for outputting numerical values representing degrees of recommendation for musical pieces. In machine learning, in a case in which a vector in which elements of sung musical pieces are set to 1, and elements of other musical pieces are set to 0 is used as learning use musical piece information, as an output numerical value becomes larger, it represents that the degree of recommendation becomes higher. In the output layer of the model for estimation, neurons corresponding to the number of singers that are recommendation targets are provided as neurons used for outputting numerical values representing degrees of recommendation of singers. In machine learning, in a case in which a vector in which elements of singers of sung musical pieces are set to 1, and elements of other singers are set to 0 is used as learning use musical piece information, as an output numerical value becomes larger, it represents that the degree of recommendation becomes higher.

The model for estimation outputs information about a musical piece to recommend in accordance with an input of information for estimation about a plurality of musical pieces having sequences. The output information about a musical piece to recommend is information about a musical piece to recommend after the last musical piece among a plurality of musical pieces relating to the input information for estimation.

In addition, the model for estimation that is generated by the model generating unit 12 may be configured by a model other than the neural network as long as a kernel or the like to be described below can be applied thereto.

Here, convolution using a kernel in a model for estimation will be described. Generally, the kernel is used in a neural network using an image as an input. The kernel is a rectangular numeric array (3×3 or the like) of dimensions set in advance. By applying the kernel to a pixel value of each pixel of the original image, a characterized output image can be acquired. By learning the numerical values of the kernel in deep learning, characteristics that are useful for a purpose can be extracted. By repeatedly learning the kernel over a plurality of layers, more complicated characteristic can be perceived in a lower layer.

When estimation using machine learning is performed using each pixel value of an image as it is, even in a case in which there is one-pixel deviation in an input image, an estimation result may become completely different. The eyes of a human do not perceive an image in units of pixels but perceive characteristics of an image such as the position of a corner and the like. By performing convolution, characterization close to the eyes of a human is performed, and estimation with characteristics of an image perceived regardless of slight deviation or the like can be performed. Also in this embodiment, characterization in the direction of sequences of musical pieces is performed by performing convolution in the direction of the sequences of the musical pieces.

Figure 4:
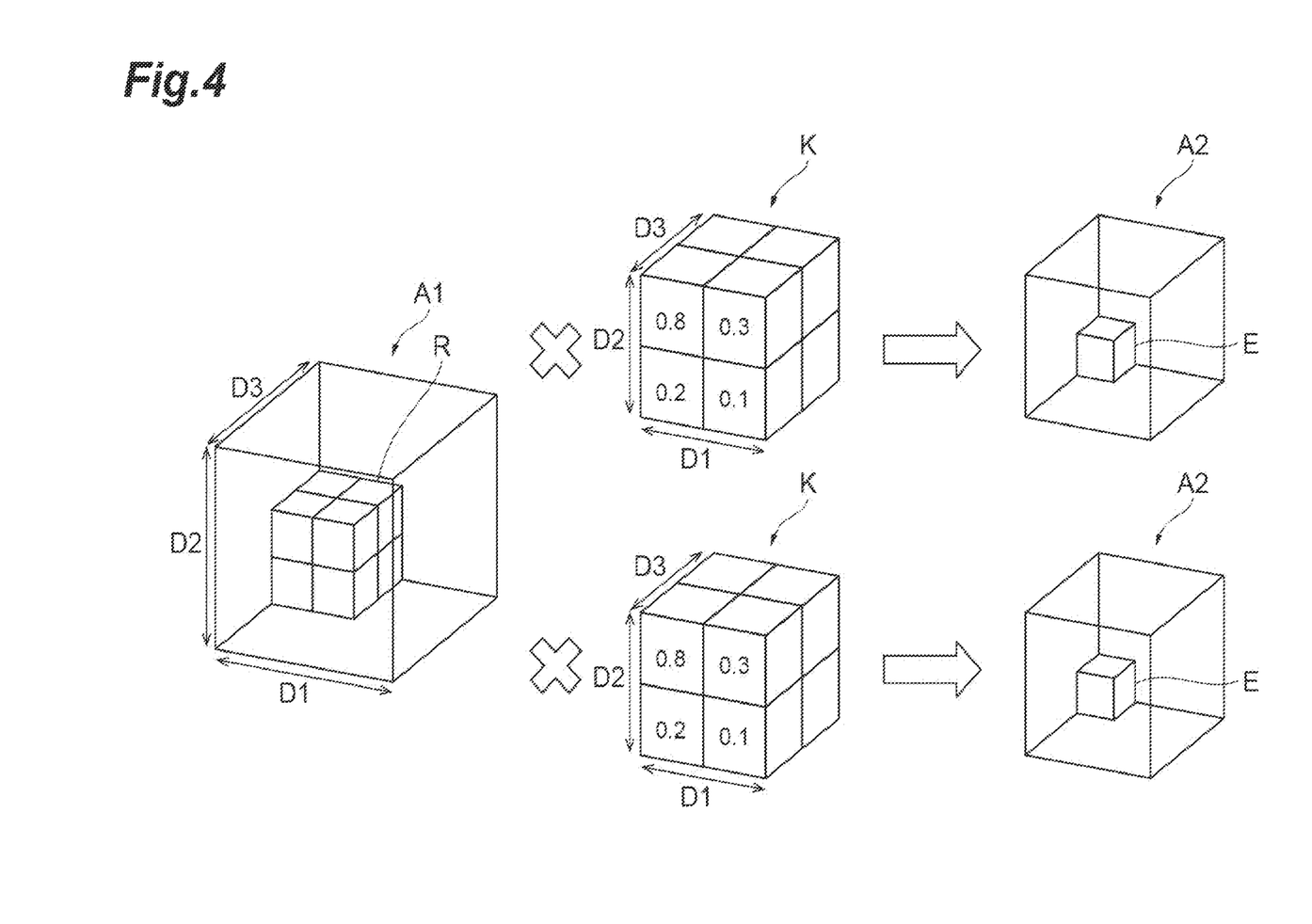
FIG. 4 is a diagram illustrating an example of a kernel included in a model for estimation and convolution using the kernel.

A model for estimation generated by the model generating unit 12 performs convolution for the information for estimation using the kernel. In the information for estimation described here, information for estimation after various arithmetic operations in the model for estimation as an intermediate process is also included. The size of the kernel and a portion of the model for estimation at which the kernel is applied are set in advance. In addition, a plurality of kernels may be provided in the model for estimation. The kernel is set to perform convolution in the dimensional direction of sequences of musical pieces of information for estimation (learning information). For example, as illustrated in FIG. 4, the size of the kernel K is regarded as a size corresponding to two elements (in other words, a size of 2×2×2 elements) in each of the time dimension D1, the frequency dimension D2, and the musical piece sequence dimension D3 in information A1 and A2 for estimation. In addition, the kernel K may have a size including a plurality of elements at least for the musical piece sequence dimension D3.

As illustrated in FIG. 4, in the model for estimation, for each element (pixel) of the information A1 for estimation before convolution, products of a numerical value of the element, a numerical value of elements corresponding to a kernel in the vicinity of the element, and a numerical value of a corresponding position in the kernel are calculated to set a numerical value of an element of the information A2 for estimation after convolution. For example, in a case in which the kernel having the size of 2×2×2 elements described above is used, for an element that is a target, a range up to a next element of each of the dimensions D1, D2, and D3 is set as a range R for multiplication with the kernel K. A numerical value of such an element and a numerical value of a corresponding position in the kernel are multiplied, and a sum thereof is set as a numerical value of an element E of the information A2 for estimation after convolution. The arithmetic operation described above is performed for all the elements of the information A1 for estimation before convolution, whereby the information A2 for estimation after convolution is generated. The size of the information A1 for estimation before convolution and the size of the information A2 for estimation after convolution are the same.

Figure 5:
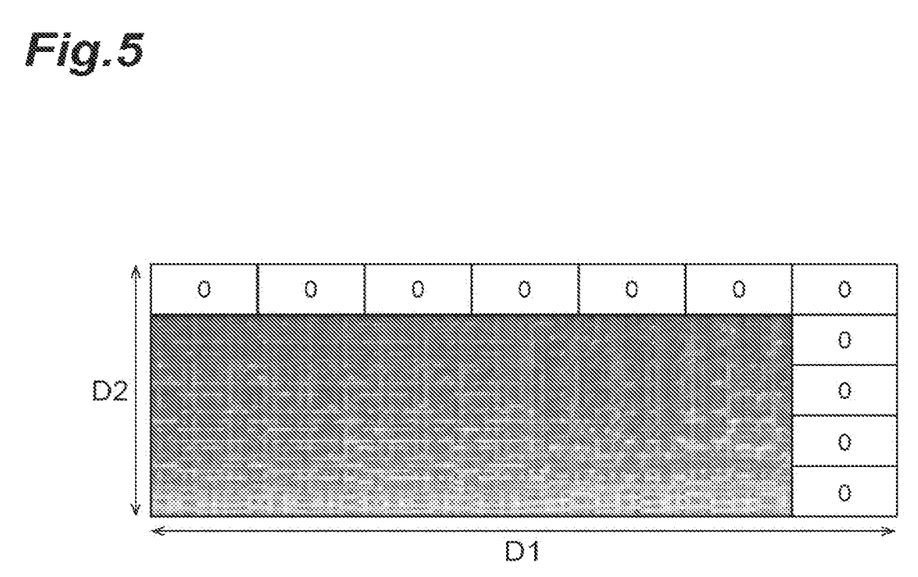
FIG. 5 is a diagram schematically illustrating zero padding according to a model for estimation.

In addition, in order to performs convolution also for an element at the end of each dimension for which convolution is performed in the information A1 for estimation before convolution, in a model for estimation, before the convolution is performed, elements are added in a dimensional direction in which the convolution is performed for the information A1 for estimation before convolution. For example, in a case in which the kernel having the size of 2×2×2 elements described above is used, as schematically illustrated in FIG. 5, zero padding for adding an element having a numerical value 0 after the last element in each of the dimensions D1, D2, and D3 of the information A1 for estimation before convolution is performed. In addition, although only the time dimension D1 and the frequency dimension D2 are illustrated in FIG. 5, an element of 0 is added also to the musical piece sequence dimension D3. In FIG. 5, the number of elements in each of the dimensions D1 and D2 does not coincide with the number of elements of 0 added.

The model for estimation generated by the model generating unit 12 performs pooling for information for estimation. In the information for estimation described here, information for estimation after various arithmetic operations as an intermediate process in the model for estimation is also included. The pooling is a process for decreasing the size of information and causing characteristics of the information to be more distinctive. The size of pooling and a portion of the model for estimation for which pooling is performed are set in advance. The pooling may be performed for the model for estimation several times. The pooling may be performed after convolution. For example, the model for estimation performs max pooling for the information for estimation. The model for estimation performs pooling in dimensions other than the musical piece sequence dimension D3. The model for estimation performs pooling in both or any one of the time dimension D1 and the frequency dimension D2.

Figure 6:
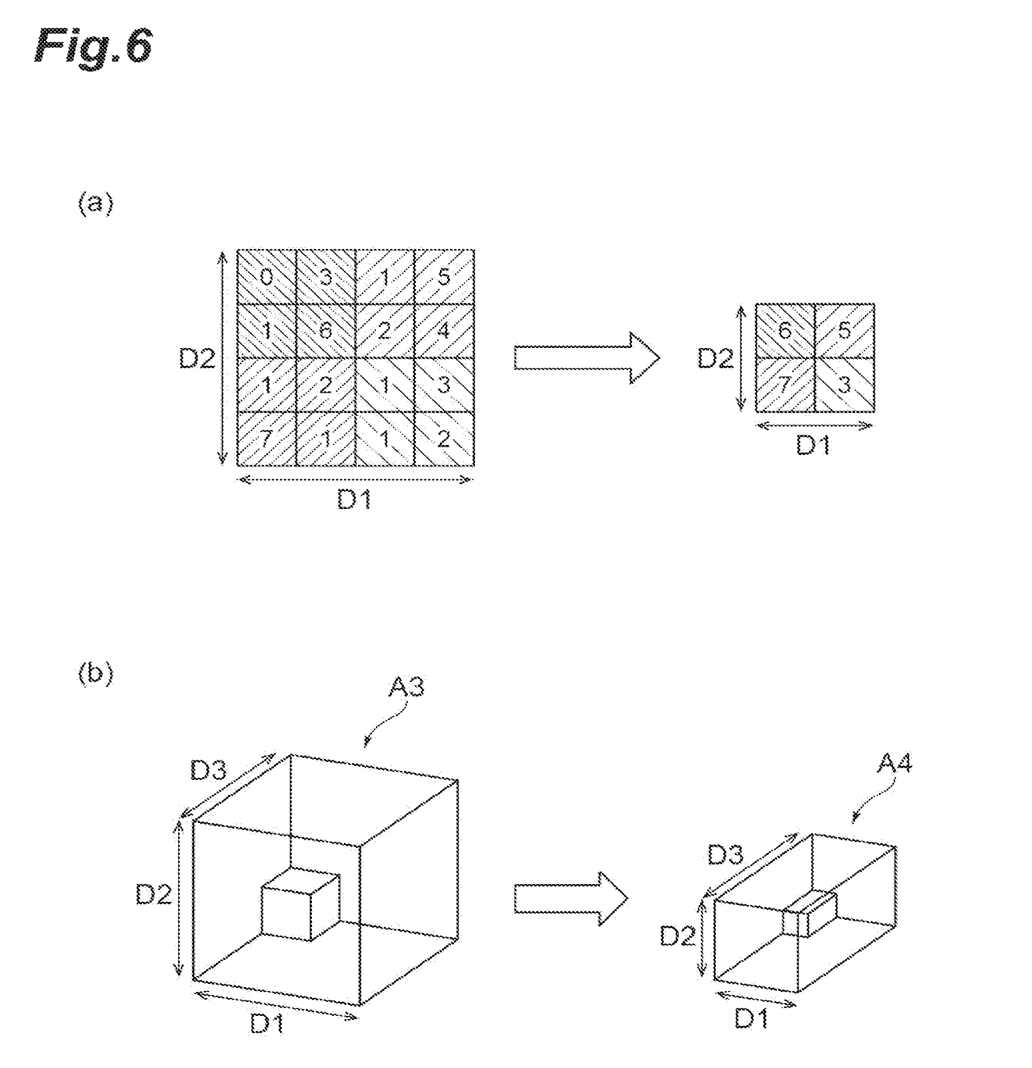
FIG. 6 is a diagram illustrating an example of max pooling according to a model for estimation.

For example, as illustrated in FIG. 6(a), the model for estimation leaves only the largest numerical value in the area of 2×2 elements of the time dimension D1 and the frequency dimension D2, thereby performing two-dimensional max pooling for causing the number of elements in such a two-dimensional direction to a half of the original number. As a result, as illustrated in FIG. 6(b), the number of elements in the time dimension D1 and the frequency dimension D2 of information A4 for estimation after max pooling becomes a half of the number of elements in the time dimension D1 and the frequency dimension D2 of information A3 for estimation before the max pooling. On the other hand, the number of elements in the musical piece sequence dimension D3 of the information A4 for estimation after the max pooling is the same as the number of elements in the musical piece sequence dimension D3 of the information A3 for estimation before the max pooling.

The model generating unit 12 receives learning data from the learning data acquiring unit 11 as an input. The model generating unit 12 performs machine learning using each numerical value represented in the learning information in the input learning data as an input value for the model for estimation and the learning use musical piece information as an output value for the model for estimation, thereby generating the model for estimation.

When machine learning of the model for estimation starts, the model generating unit 12 assigns initial values of the kernel, for example, as random numerical values or setting values set in advance. In the machine learning, the numerical values configuring the kernel are learned as well. In other words, also the numerical values configuring the kernel are gradually changed at the time of learning and become numerical values according to the purpose.

The machine learning described above can be performed similar to the method of conventional machine learning. The model generating unit 12 outputs the generated model for estimation to the model using system 20. For example, the processes performed by the learning data acquiring unit 11 and the model generating unit 12 may be performed as a daily batch process. The functions of the model generation system 10 according to this embodiment have been described as above.

Subsequently, the function of the model using system 20 according to this embodiment will be described. As illustrated in FIG. 1, the model using system 20 is configured to include a model use data acquiring unit 21 and a model using unit 22.

The model use data acquiring unit 21 is a functional unit that acquires model use data used for the model for estimation. The model use data acquiring unit 21 acquires information for estimation in which information about audio data of a plurality of musical pieces having sequences is aligned in the sequence dimension in the order of the sequence as the model use data.

The model use data acquiring unit 21 acquires data at the time when a user performs karaoke at a location such as a karaoke parlor, in other words, when a musical piece is used. When a user performs karaoke, a recommendation content is requested for the recommendation server 1 from the terminal 30 used by the user. The request of the recommendation content is performed after a user sings a musical piece.

When a user starts karaoke and sings a musical piece, the terminal 30 includes information representing the musical piece sung by the user in a request for a recommended content and transmits the request to the recommendation server 1. For example, the transmitted information is information represented in each row illustrated in FIG. 3. Information about a plurality of musical pieces (for example, nearest N logs) may be included in the transmitted information. The model use data acquiring unit 21 receives the information transmitted from the terminal 30. The model use data acquiring unit 21 associates a spectrogram that is information based on the audio data described above with the information of the musical piece received from the terminal 30 by using the musical piece ID as a key. The association is performed similar to the method used by the learning data acquiring unit 11.

The model use data acquiring unit 21 sequentially receives the transmitted information from the terminal 30 and performs the association described above. In addition, the model use data acquiring unit 21 may determine whether information relating to each musical piece acquired similar to the method used by the learning data acquiring unit 11 configures the same session as that of information about another musical piece. The model use data acquiring unit 21 generates information about musical pieces of a time series for each session on the basis of the determination. The model use data acquiring unit 21 generates and acquires information for estimation from the generated information about musical pieces of the time series. The model use data acquiring unit 21 generates and acquires information for estimation in which spectrograms of a plurality of musical pieces corresponding to a number set in advance retrospectively from a latest musical piece including the latest musical piece of the session are aligned in the musical piece sequence dimension in order of the sequences. The number set in advance is similar to that at the time of generating the learning information described above. The model use data acquiring unit 21 sets the generated information for estimation as information used for recommendation to a user relating to the session.

The model use data acquiring unit 21 outputs the acquired information for estimation to the model using unit 22.

The model using unit 22 is a functional unit that performs estimation by inputting the information for estimation acquired by the model use data acquiring unit 21 to the model for estimation. The model using unit 22 inputs the information for estimation acquired by the model use data acquiring unit 21 to the model for estimation, thereby determining information to recommend.

The model using unit 22 inputs and stores the model for estimation generated by the model generation system 10 and uses the model for estimation for determining information about a musical piece to recommend to a user. The model using unit 22 receives the information for estimation from the model use data acquiring unit 21 as an input.

The model using unit 22 uses the information for estimation as an input value input to the model for estimation and acquires recommendation information that is an output value from the model for estimation. In an arithmetic operation at this time, the model using unit 22 performs convolution (including zero padding as preprocessing thereof) using the kernel in the musical piece sequence dimension and pooling in a dimension other than the musical piece sequence dimension for the input information for estimation. The recommendation information that is an output value is a numerical value representing a degree of recommendation for each musical piece and a numerical value (vector) representing a degree of recommendation for each singer.

The model using unit 22 determines information to recommend to a user on the basis of the output value. For example, the model using unit 22 determines that a musical piece and a singer having the largest numerical values are recommended to a user. Alternatively, the model using unit 22 determines that musical pieces and singers corresponding to a number set in advance in order of the largest to smallest numerical value are recommended to a user. The model using unit 22 performs the determination every time when new recommendation information is acquired, in other words, every time when information representing a new musical piece as a sung musical piece is transmitted from the terminal 30. The model using unit 22 transmits the determined information to the terminal 30. The terminal 30 receives the information about recommendation transmitted from the recommendation server 1 and performs output such as display. The user can determine a musical piece to sing next by referring to the display.

For example, the processes performed by the model use data acquiring unit 21 and the model using unit 22 are performed as real time processing according to reception of information from the terminal 30 as described above. The function of the model using system 20 according to this embodiment has been described as above.

Figure 7:
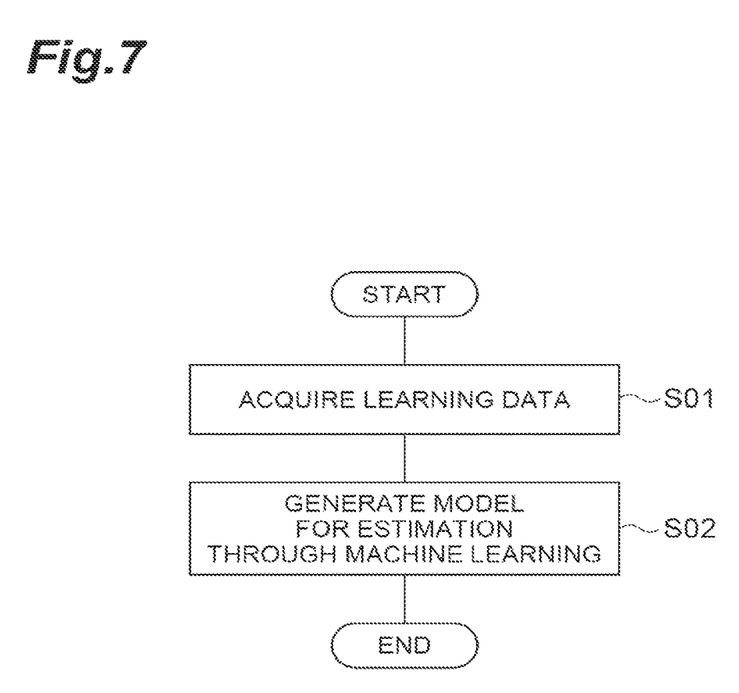
FIG. 7 is a flowchart illustrating a process performed when a model for estimation is generated by a recommendation server that is a system for generating a model for estimation and an estimation system according to an embodiment of the present invention.
Figure 8:
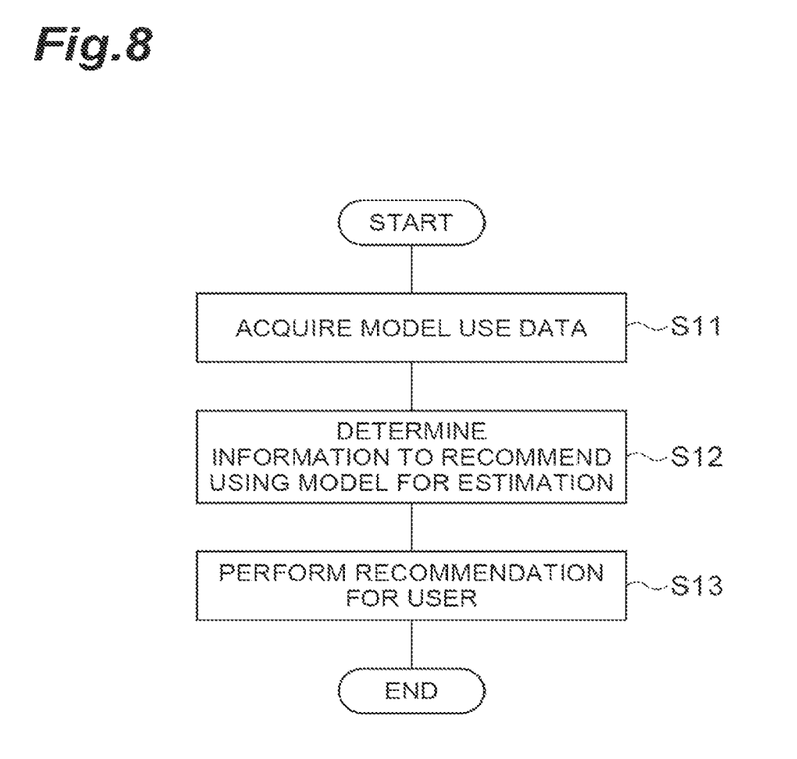
FIG. 8 is a flowchart illustrating a process that is performed when recommendation of a musical piece to a user is performed by a recommendation server that is a system of generating a model for estimation and an estimation system according to an embodiment of the present invention.

Subsequently, the process performed by the recommendation server 1 according to this embodiment (an operation method performed by the recommendation server 1) will be described with reference to flowcharts illustrated in FIGS. 7 and 8. First, a process performed when a model for estimation is generated, in other words, a process performed by the model generation system 10 according to this embodiment will be described with reference to the flowchart illustrated in FIG. 7.

In this process, first, learning data used for machine learning generating a model for estimation is acquired by the learning data acquiring unit 11 (S01). The learning data is the learning information and the learning use musical piece information. Subsequently, machine learning is performed on the basis of the learning data by the model generating unit 12, whereby a model for estimation is generated (S02). When this machine learning is performed, the learning information is set as an input to the model for estimation, and information based on the learning use musical piece information is set as an output of the model for estimation. The model for estimation generated using machine learning performs convolution using the kernel in the musical piece sequence dimension and performs pooling in dimensions other than the musical piece sequence dimension. The process performed when a model for estimation is generated has been described as above.

Subsequently, a process performed when recommendation relating to a musical piece to a user is performed, in other words, a process performed by the model using system 20 according to this embodiment will be described with reference to a flowchart illustrated in FIG. 8. In this process, first, model use data used for a model for estimation is acquired by the model use data acquiring unit 21 (S11). The model use data is acquired using reception of a request for a recommendation content transmitted from the terminal 30 as a trigger. The model use data is information for estimation.

Subsequently, the information for estimation that is model use data is input to the model for estimation by the model using unit 22, and recommendation information about a musical piece to recommend to a user is determined (S12). In an arithmetic operation at this time, the model using unit 22 performs convolution (including zero padding as preprocessing thereof) using the kernel in the musical piece sequence dimension and pooling in a dimension other than the musical piece sequence dimension for the input information for estimation. Subsequently, recommendation relating to a musical piece to a user is performed on the basis of time series information for recommendation by the model using unit 22 (S13). The user can determine a musical piece to sing next by referring to the recommended information. The process performed when recommendation relating to a musical piece to a user is performed has been described as above.

According to this embodiment, estimation can be performed using information in which information about audio data of a plurality of musical pieces having sequences is aligned in the sequence dimension in order of the sequence on the basis of the model for estimation generated using machine learning. In this model for estimation, convolution using the kernel is performed in the sequence dimension. For this reason, a characteristic relating to the sequence of musical pieces is appropriately considered in the estimation. For example, according to convolution, robust estimation can be performed also for slight deviation in the sequence direction. Thus, according to this embodiment, estimation based on the information about musical pieces can be appropriately performed. In addition, according to this embodiment, musical pieces are analyzed in the musical piece sequence direction using a model for estimation, and thus the analysis does not need to be performed using another algorithm.

In addition, as in this embodiment, generation of a model for estimation in which pooling is performed in dimensions other than the sequence dimension (for example, a time and a frequency in the spectrogram) and estimation using the model for estimation may be performed. For example, as in this embodiment, max pooling may be performed. According to this configuration, appropriate characterization is performed in dimensions other than the sequence dimension, and pooling is not performed in the sequence direction, and thus lack of characteristics in the sequence dimension direction can be inhibited. Thus, according to this configuration, more appropriate estimation can be performed. Here, the model for estimation may be configured not to necessarily perform the pooling described above.

In addition, as in this embodiment, the information about audio data may be configured to be a spectrogram. According to this configuration, estimation based on information about musical pieces can be reliably and appropriately performed. Here, information other than the spectrogram may be used as the information about audio data.

In addition, as in this embodiment, the model for estimation may output information about a musical piece to recommend. According to such a configuration, recommendation with the sequence of musical pieces, which have been sung, taken into account can be performed, and thus recommendation relating to a musical piece can be appropriately performed. Here, the model for estimation may be configured not to necessarily perform recommendation relating to a musical piece and may perform certain estimation on the basis of information about musical pieces. For example, the model for estimation may estimate a type of user.

In this embodiment, not only recommendation of a musical piece but also recommendation of a singer can be performed using the same model for estimation. However, recommendation of both of these does not necessarily need to be performed, but only one thereof may be recommended. In addition, any information about to a musical piece other than that described above may be recommended.

In addition, in generation of a model for estimation using machine learning and estimation using the generated model for estimation, information other than the information about audio data of a plurality of musical pieces having sequences may be also used. In other words, information other than the information about audio data of a plurality of musical pieces having sequences may be configured to be an input to the model for estimation.

In this embodiment, although the recommendation server 1 is configured to include the model generation system 10 and the model using system 20, the model generation system 10 and the model using system 20 may be implemented independently of each other.

In addition, the model for estimation generated by the model generation system 10 is assumed to be used as a program module that is a part of artificial intelligence software. The model for estimation is used in a computer including a CPU and a memory. More specifically, in accordance with an instruction from the model for estimation stored in the memory, the CPU of the computer operates to input information to an input layer of a neural network, perform an arithmetic operation based on weighting coefficients and the like that have been learned in the neural network, and output a result from an output layer of the neural network.

Each block diagram used for description of the embodiment described above illustrates blocks in units of functions. Such functional blocks (component units) are realized by an arbitrary combination of at least one of hardware and software. In addition, a method for realizing each functional block is not particularly limited. In other words, each functional block may be realized by one device that is combined physically or logically or a plurality of devices by directly or indirectly (for example, using a wire, wirelessly, or the like) connecting two or more devices separated physically or logically. A functional block may be realized by combining software with one device or the plurality of devices described above.

As functions, there are deciding, determining, judging, computing, calculating, processing, deriving, inspecting, searching, checking, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like, and the functions are not limited thereto. For example, a functional block (constituent unit) enabling transmitting is referred to as a transmitting unit or a transmitter. As described above, a method for realizing all the functions is not particularly limited.

Figure 9:
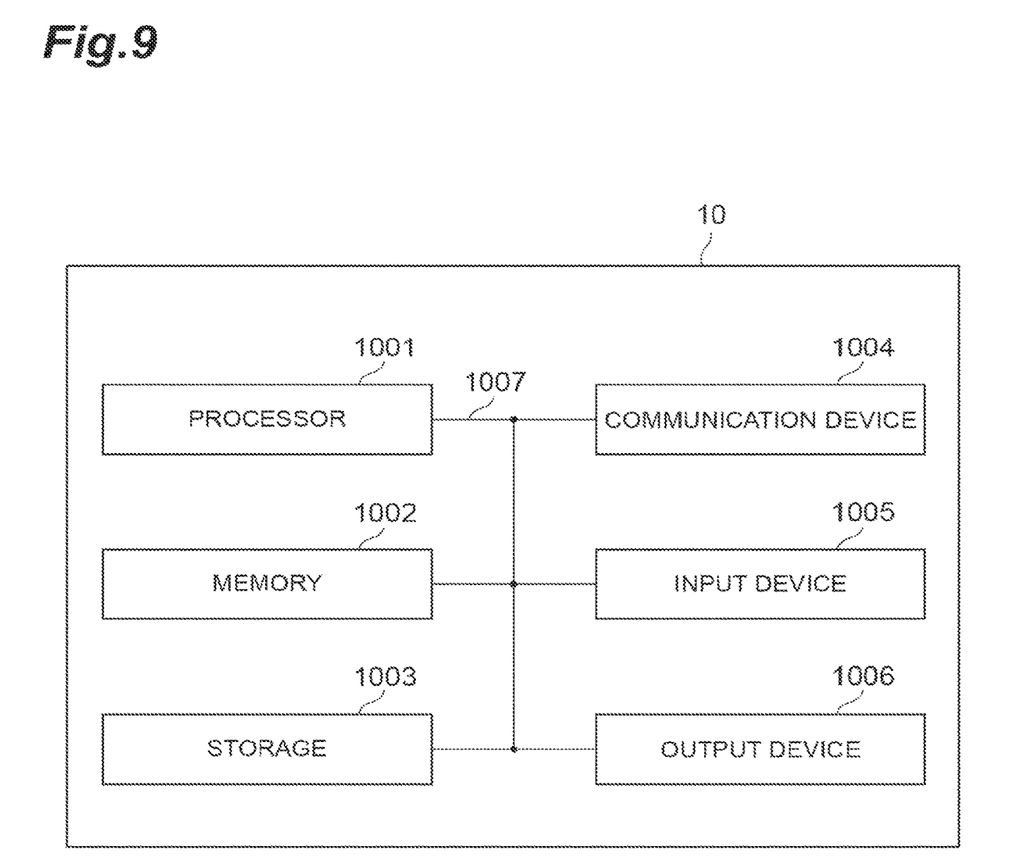
FIG. 9 is a diagram illustrating the hardware configuration of a recommendation server that is a system of generating a model for estimation and an estimation system according to an embodiment of the present invention.

For example, the recommendation server 1 according to one embodiment of the present disclosure may function as a computer that performs information processing of the present disclosure. FIG. 9 is a diagram illustrating one example of the hardware configuration of the recommendation server 1 according to one embodiment of the present disclosure. The recommendation server 1 described above, physically, may be configured as a computer device including a processor 1001, a memory 1002, a storage 1003, a communication device 1004, an input device 1005, an output device 1006, a bus 1007, and the like. In addition, also the terminal 30 and the data server 40 may have a device configuration similar thereto.

In addition, in the following description, a term "device" may be rephrased as a circuit, a device, a unit, or the like. The hardware configuration of the recommendation server 1 may be configured to include one or a plurality of devices illustrated in the drawing and may be configured without including some of these devices.

Each function of the recommendation server 1 may be realized when the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each function of the recommendation server 1 described above may be realized by the processor 1001.

In addition, the processor 1001 reads a program (program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, each function of the recommendation server 1 may be realized by a control program that is stored in the memory 1002 and operated by the processor 1001. Although the various processes described above have been described as being executed by one processor 1001, the processes may be executed simultaneously or sequentially by two or more processors 1001. The processor 1001 may be mounted using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the information processing according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium included in the recommendation server 1, for example, may be a database including at least one of the memory 1002 and a storage 1003, a server, or any other appropriate medium.

The communication device 1004 is hardware (a transmission/reception device) for performing inter-computer communication through at least one of a wired network and a wireless network and, for example, may be called also a network device, a network controller, a network card, a communication module, or the like.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the recommendation server 1 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

The input/output information and the like may be stored in a specific place (for example, a memory) or managed using a management table. The input/output information and the like may be overwritten, updated, or added to. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of being X) is not limited to being performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

It is apparent that software, regardless of whether it is called software, firmware, middleware, a microcode, a hardware description language, or any other name, may be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wiring technology such as a coaxial cable, an optical fiber cable, a twisted pair, a digital subscriber line (DSL) or the like and a radio technology (infrared rays, microwaves, and the like), at least one of such a wiring technology and a radio technology is included in the definition of the transmission medium.

Terms such as "system" and "network" used in the present disclosure are interchangeably used.

In addition, information, a parameter, and the like described in the present disclosure may be represented using absolute values, relative values with respect to predetermined values, or other corresponding information.

At least one of a server and a client may be called a transmission device, a receiving device, a communication device, or the like. In addition, at least one of the server and the client may be a device mounted in a mobile body, a mobile body, or the like. The mobile body may be a riding object (for example, a car, an airplane, or the like), may be a mobile body that moves unmanned (for example, a drone, an automatic driving car, or the like), or may be a robot (a manned type or a manned type). In addition, at least one of the server and the client includes a device that does not necessarily move at the time of a communication operation. For example, at least one of the server and the client may be an Internet of Things (IoT) device such as a sensor.

In addition, a server in the present disclosure may be rephrased with a client terminal. For example, each form/embodiment of the present disclosure may be applied to a configuration acquired by substituting communication between a server and a client terminal with communication among a plurality of user terminals (for example, it may be referred to as Device-to-Device (D2D), Vehicle-to-Everything (V2X), or the like). In such a case, the function included in the server described above may be configured to be included in the client terminal.

Similarly, the client terminal in the present disclosure may be rephrased with a server. In such a case, the function included in the client terminal described above may be configured to be included in the server.

Terms such as "deciding" or "determining" used in the present disclosure may include various operations of various types. The "deciding" and "determining", for example, may include a case in which judging, calculating, computing, processing, deriving, investigating, looking up, search, and inquiry (for example, looking up a table, a database, or any other data structure), or ascertaining is regarded as "deciding" and "determining". In addition, "deciding" and "determining" may include a case in which receiving (for example, receiving information), transmitting (for example, transmitting information), input, output, or accessing (for example, accessing data in a memory) is regarded as "deciding: and "determining". Furthermore, "deciding" and "determining" may include a case in which resolving, selecting, choosing, establishing, comparing, or the like is regarded as "deciding" and "determining". In other words, "deciding" and "determining" include a case in which a certain operation is regarded as "deciding" and "determining". In addition, "deciding (determining)" may be rephrased with "assuming", "expecting", "considering", and the like.

Terms such as "connected" or "coupled" or all the modifications thereof mean all the kinds of direct or indirect connection or coupling between two or more elements and may include presence of one or more intermediate elements between two elements that are mutually "connected" or "coupled". Coupling or connection between elements may be physical coupling or connection, logical coupling or connection, or a combination thereof. For example, "connection" may be rephrased with "access". When used in the present disclosure, two elements may be considered as being mutually "connected" or "coupled" by using one or more wires and at least one of a cable and a print electric connection and, as several non-limiting and non-comprehensive examples, by using electromagnetic energy such as electromagnetic energy having wavelengths in a radio frequency region, a microwave region, and a light (both visible light and non-visible light) region.

Description of "on the basis of" used in the present disclosure does not mean "only on the basis of" unless otherwise mentioned. In other words, description of "on the basis of" means both "only on the basis of" and "on the basis of at least."

In the present disclosure, in a case in which names such as "first", "second", and the like is used, referring to each element does not generally limit the amount or the order of such an element. Such names may be used in the present disclosure as a convenient way for distinguishing two or more elements from each other. Accordingly, referring to the first and second elements does not mean that only the two elements are employed therein or the first element should precede the second element in a certain form.

In a case in which "include," "including," and modifications thereof are used in the present disclosure, such terms are intended to be inclusive like a term "comprising." In addition, a term "or" used in the present disclosure is intended to be not an exclusive logical sum.

In the present disclosure, for example, in a case in which an article such as "a," "an," or "the" in English is added through a translation, the present disclosure may include a plural form of a noun following such an article.

In the present disclosure, a term "A and B are different" may means that "A and B are different from each other". In addition, the term may mean that "A and B are different from C". Terms "separated", "combined", and the like may be interpreted similar to "different".

REFERENCE SIGNS LIST 1 recommendation server
10 model generation system
11 learning data acquiring unit
12 model generating unit
20 model using system
21 model use data acquiring unit
22 model using unit
30 terminal
40 data server
1001 processor
1002 memory
1003 storage
1004 communication device
1005 input device
1006 output device
1007 bus

The invention claimed is:

1. A system of generating a model for estimation that generates the model for estimation used for estimation based on information about musical pieces, the system comprising circuitry configured to:
acquire learning information that is learning data used for machine learning and in which information about audio data of a plurality of musical pieces having sequences is aligned in a dimension of the sequences in order of the sequences; and
generate the model for estimation by performing machine learning using the learning information as an input to the model for estimation performing convolution using a kernel in the dimension of the sequences, wherein:
the learning information includes time, frequency and sequence data extracted from the audio data of the musical pieces,
the circuitry is configured to perform convolution in the time, frequency and sequence dimensions,
the circuitry generates the model for estimation performing pooling in time and frequency dimensions without performing pooling in the dimension of the sequences, and
the information about the audio data is a spectrogram.

2. The system of generating a model for estimation according to claim 1, wherein the circuitry generates the model for estimation outputting information about a musical piece to recommend.

3. An estimation system that performs estimation using a model for estimation generated by the system of generating a model for estimation according to claim 1, the estimation system comprising circuitry configured to:
acquire information for estimation in which information about audio data of a plurality of musical pieces having sequences is aligned in a dimension of the sequences in order of the sequences; and
perform estimation by inputting the information for estimation to the model for estimation.

* * * * *